United States Patent
Kaneko et al.

(10) Patent No.: US 12,500,041 B2
(45) Date of Patent: Dec. 16, 2025

(54) ELECTROLYTIC CAPACITOR

(71) Applicants: RUBYCON CORPORATION, Ina (JP); HEC KOUYO JAPAN CO., LTD., Tokyo (JP)

(72) Inventors: Tsutomu Kaneko, Ina (JP); Yoshishige Sakurai, Ina (JP)

(73) Assignees: RUBYCON CORPORATION, Ina (JP); HEC KOUYO JAPAN CO., LTD., Tokyo (JP)

( * ) Notice: Subject to any disclaimer, the term of this patent is extended or adjusted under 35 U.S.C. 154(b) by 0 days.

(21) Appl. No.: 18/569,030

(22) PCT Filed: Jul. 5, 2022

(86) PCT No.: PCT/JP2022/026649
§ 371 (c)(1),
(2) Date: Dec. 11, 2023

(87) PCT Pub. No.: WO2023/286654
PCT Pub. Date: Jan. 19, 2023

(65) Prior Publication Data
US 2024/0282534 A1 Aug. 22, 2024

(30) Foreign Application Priority Data

Jul. 15, 2021 (WO) .................. PCT/JP2021/026547
Jun. 1, 2022 (WO) .................. PCT/JP2022/022316

(51) Int. Cl.
*H01G 9/052* (2006.01)
*H01G 9/035* (2006.01)
(Continued)

(52) U.S. Cl.
CPC .......... *H01G 9/0525* (2013.01); *H01G 9/035* (2013.01); *H01G 9/045* (2013.01); *H01G 9/145* (2013.01)

(58) Field of Classification Search
CPC ...... H01G 9/0525; H01G 9/035; H01G 9/145; H01G 9/052; H01G 9/045
See application file for complete search history.

(56) References Cited

U.S. PATENT DOCUMENTS 6,493,211 B1 12/2002 Sugiyama et al.
2007/0121276 A1 5/2007 Uzawa et al.
(Continued)

FOREIGN PATENT DOCUMENTS

CN 108292566 A 7/2018
JP S59-140430 U 9/1984
(Continued)

OTHER PUBLICATIONS

PCT/ISA/210, "International Search Report for PCT International Application No. PCT/JP2022/026649," Sep. 20, 2022.
(Continued)

*Primary Examiner* — David M Sinclair
(74) *Attorney, Agent, or Firm* — HAUPTMAN HAM, LLP

(57) ABSTRACT

The present invention addresses a problem of providing an electrolytic capacitor with which an etching treatment of an electrode material is not required and with which it is possible to achieve higher capacitance than conventional electrolytic capacitors using electrode foils having surface areas increased only by etching. This electrolytic capacitor, as a solution, includes a capacitor element having an anode foil, a cathode foil, and separators interposed between the anode foil and the cathode foil; and an electrolytic solution impregnated in the capacitor element, wherein the anode foil or the cathode foil has a sintered material formed with sintered particles of power of at least one kind of aluminum and an aluminum alloy.

3 Claims, 3 Drawing Sheets

(51) Int. Cl.
  *H01G 9/045* (2006.01)
  *H01G 9/145* (2006.01)

(56) References Cited

U.S. PATENT DOCUMENTS

| | | | |
|---|---|---|---|
| 2008/0247119 A1* | 10/2008 | Kakuma | H01G 9/0425 |
| | | | 427/80 |
| 2011/0038098 A1 | 2/2011 | Taira et al. | |
| 2012/0026645 A1* | 2/2012 | Sakakura | H01G 9/035 |
| | | | 252/62.2 |
| 2014/0211375 A1 | 7/2014 | Taira et al. | |
| 2014/0368975 A1 | 12/2014 | Taira et al. | |
| 2018/0350526 A1* | 12/2018 | Shimizu | H01G 9/0029 |
| 2019/0362901 A1* | 11/2019 | Shimizu | H01G 9/055 |

FOREIGN PATENT DOCUMENTS

| | | |
|---|---|---|
| JP | H02-267916 A | 11/1990 |
| JP | H04-6816 A | 1/1992 |
| JP | H04-42911 A | 2/1992 |
| JP | H04-284614 A | 10/1992 |
| JP | H06-314636 A | 11/1994 |
| JP | 2005-019773 A | 1/2005 |
| JP | 2005-303062 A | 10/2005 |
| JP | 2006-108159 A | 4/2006 |
| JP | 2008-098279 A | 4/2008 |
| JP | 2013-026275 A | 2/2013 |
| JP | 2017-076699 A | 4/2017 |
| JP | 2017-188640 A | 10/2017 |
| WO | 00/55876 A1 | 9/2000 |
| WO | 2009/130765 A1 | 10/2009 |
| WO | 2013/118818 A1 | 8/2013 |
| WO | 2019/026701 A1 | 2/2019 |
| WO | 2020/027124 A1 | 2/2020 |

OTHER PUBLICATIONS

Makoto UE, "What are the factors that determine the withstand voltage of aluminum electrolytic capacitors: What is dielectric breakdown from the perspective of an electrolyte manufacturer?" 16th ARS Lake Biwa Conference Lecture Proceedings, Tsukuba Research Institute, Mitsubishi Chemical Corporation, Oct. 30, 1999, p. 55-61.

Isaya Nagata, "Electrolyte cathode aluminum electrolytic capacitor," Japan Capacitor Industrial Co., Ltd., Feb. 24, 1997, p. 387-414.

Zongli Dou et al., "The Development of Electrolytes in Aluminium Electrolytic Capacitors for Automotive and High Temperature Applications," Carts Europe 2008, Electronic Components Industry Association (ECIA), 2008, p. 1 and p. 11.

Tomiyama Pure Chemical Industries, Ltd., "High Purity Chemicals for Electrolytic Capacitors," Tomiyama Pure Chemical Industries, Ltd., Apr. 1, 2005, No. 1-14.

Taiwan Patent Office, Notification of Review Opinions for Taiwanese Patent Application No. 111120814 dated Nov. 10, 2025; 22 pp.

* cited by examiner

ELECTROLYTIC CAPACITOR

RELATED APPLICATIONS

The present application is a National Phase of International Application No. PCT/JP2022/026649 filed Jul. 5, 2022, and claims priorities from International Applications No. PCT/JP2021/026547 filed Jul. 15, 2021; and No. PCT/JP2022/022316 filed Jun. 1, 2022, the disclosures of which are hereby incorporated by reference herein in its entirety.

TECHNICAL FIELD

The present invention relates to an electrolytic capacitor.

BACKGROUND ART

An electrolytic capacitor is characterized by a small size, a large capacity and a low price and is widely used as an important component of electronics, electric devices, vehicle devices and the like.

A conventional electrolytic capacitor, such as the most widely spread aluminum electrolytic capacitors for example, can be produced using an anode foil obtained by chemically or electrochemically etching a high purity aluminum foil to increase the surface area and then forming a film by anodic oxidation on the surface of the aluminum foil and a cathode foil with an etched surface. Next, an element having a structure in which the anode foil and the cathode foil obtained are arranged to face each other and wound with a separator interposed between the foils is obtained, and the element having the structure is impregnated with an electrolytic solution. The element after impregnation with the electrolytic solution is housed in a case and tightly closed with an elastic sealing part, and thus an electrolytic capacitor is finished.

Increasing the capacity of an electrolytic capacitor is an important market demand which is directly connected to miniaturization of the device, and an attempt for increasing the capacity by increasing the etching ratio has been made. However, there is a theoretical limit to the increase in the surface area by etching, and it is becoming impossible to meet the demand for an increase in the capacity which grows every year. Moreover, in order also to reduce the environmental load due to hydrochloric acid containing sulfuric acid, phosphoric acid, nitric acid or the like which is used for etching treatment, a method for increasing the surface area instead of the etching foil is desired.

Here, regarding a method for increasing the surface area instead of the etching foil, a capacitor using a metal sintered material for an anode has been proposed (PTL 1: JP-UM-A-59-140430).

However, the distance between the anode and cathode collectors is long in a capacitor having such a shape, and thus the capacitor has drawbacks because the resistance through the electrolytic solution is large and because the capacitance at a high frequency decreases.

Regarding another method for increasing the surface area, aluminum electrolytic capacitors characterized by using a foil obtained by adhering fine aluminum powder on the surface of an electrode foil have been proposed (PTL 2: JP-A-H02-267916 and PTL 3: JP-A-2006-108159).

However, the particle sizes of the aluminum powder of the electrode foils disclosed in the documents are small, and thus there are drawbacks because the space among the sintered particles is filled during formation of the anode oxide film, which may decrease the capacitance, and because the capacitance at a high frequency decreases when an electrolytic solution for a middle- to high-pressure capacitor having a relatively high viscosity and a relatively high specific resistance is used.

CITATION LIST

Patent Literature

PTL 1: JP-UM-A-S59-140430
PTL 2: JP-A-H02-267916
PTL 3: JP-A-2006-108159

SUMMARY OF INVENTION

Technical Problem

The present invention has been made in view of the demand for an increase in the capacity and the reduction in the environmental load described above and aims to provide an electrolytic capacitor which does not require etching treatment of an electrode material and which can achieve a higher capacitance than an electrolytic capacitor using the conventional electrode foils having a surface area that is increased by etching only.

Solution to Problem

The electrolytic capacitor according to the present invention is an electrolytic capacitor having a capacitor element having an anode foil, a cathode foil and a separator interposed between the anode foil and the cathode foil and an electrolytic solution impregnated in the capacitor element, and the electrolytic capacitor is characterized in that the anode foil or the cathode foil has a sintered material formed with sintered particles of powder of at least one kind of aluminum and an aluminum alloy.

The anode foil or the cathode foil is desirably formed with the sintered material and a base material supporting the sintered material. Moreover, the specific resistance of the electrolytic solution is desirably 1500 Ω·cm or less, and the average particle size (D50) of the powder or the sintered particles is desirably 6 µm or less.

Furthermore, the electrolytic solution desirably contains a solvent containing an organic solvent or a solvent containing a mixture of water and an organic solvent and at least one kind of electrolyte selected from the group consisting of an organic acid or an organic acid salt, an inorganic acid or an inorganic acid salt and a mixture of an organic acid or an organic acid salt and an inorganic acid or an inorganic acid salt.

Advantageous Effects of Invention

According to the electrolytic capacitor of the present invention, a large capacitance can be achieved due to the surface area of an electrode foil which is the same as or larger than the pit area of a conventional etching foil. Moreover, etching treatment of an electrode foil is no longer always necessary, and as a result, the environmental load can be reduced.

DESCRIPTION OF EMBODIMENTS

Preferable embodiments of the present invention are explained below, but the present invention is not limited only to the embodiments.

Figure 1:
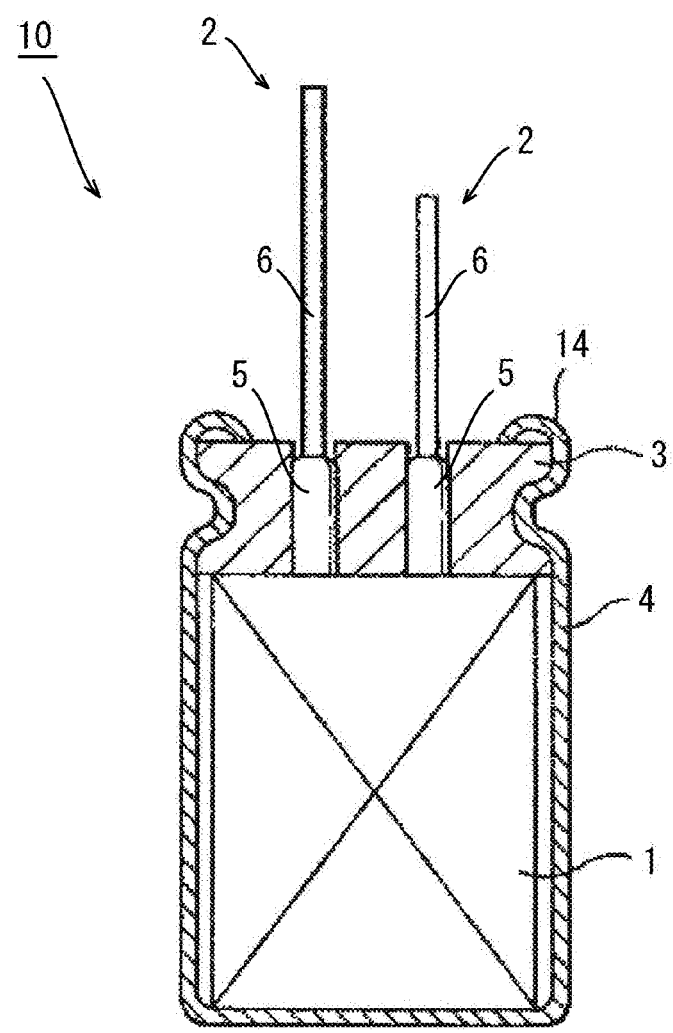
FIG. 1 is a schematic sectional view illustrating an example of the electrolytic capacitor according to the embodiment.
Figure 2:
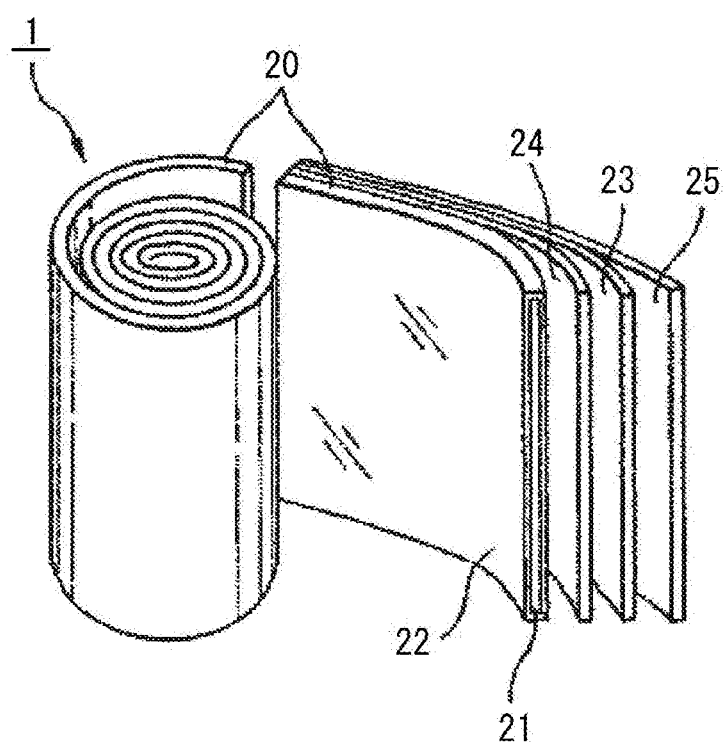
FIG. 2 is an explanatory figure explaining an example of the capacitor element according to the embodiment.

FIG. 1 is a sectional view illustrating an outline of the whole structure of an electrolytic capacitor 10 according to the embodiment, and FIG. 2 is an explanatory figure of a capacitor element 1.

The electrolytic capacitor 10 according to the embodiment is configured by disposing the capacitor element 1 in an external case 4 having a cylindrical shape with a bottom formed with a metal such as aluminum, tightly closing the opening of the external case 4 with a sealing part 3 and fixing the sealing part 3 by swaging the opening edge (a curl 14).

The capacitor element 1 according to the embodiment is a winding-type capacitor element 1 configured by winding an anode foil 20 obtained by forming a sintered material 22 of aluminum powder on the surface of a core material (base material) 21, a cathode foil 23 and a first separator 24 and a second separator 25 disposed between the anode foil 20 and the cathode foil 23, and this is impregnated with an electrolytic solution and then sealed in the external case 4. Here, the reference number 2 indicates lead wires 2 connected to the anode foil 20 and the cathode foil 23. The lead wires 2 each have a lead tab 5 and a terminal 6 which are the connector to the anode foil 20 or the cathode foil 23. However, the type of the electrolytic capacitor 10 according to the present invention is not limited and may be, for example, a lamination type, a coin type or the like in addition to the winding type illustrated in FIG. 1. Moreover, the type of the terminal parts (the entire parts which are connected to the electrode foils 20, 23 and exposed to the outside of the electrolytic capacitor 10) is not limited and may be, for example, a snap-in type, a screw terminal type or the like in addition to the lead type illustrated in FIG. 1. Thus, the shape, the number, the connection type and the like of the parts composing the terminal parts are not limited.

For example, in a snap-in-type electrolytic capacitor (not illustrated) in which the terminals 6 are provided to stand on a substrate of a two-layer sealing part 3, the lead tabs 5, which are the connectors to the electrode foils 20, 23, may be connected to the electrode foils 20, 23 at a plurality of sites. This structure may be understood as a structure in which a plurality of lead tabs 5 are provided or may be understood as a structure in which the lead tabs 5 are branched at the ends. According to the structure, compared to the structure in which one lead tab 5 is connected to each of the electrode foils 20, 23 (at one site), the metal resistance and the inductance of the electrode foils 20, 23 can be reduced, and reduction in the impedance of the electrolytic capacitor and an increase in the allowable ripple current can be achieved. Moreover, because the lead tabs 5 connected to the electrode foils 20, 23 at a plurality of sites are assembled and fixed to the terminals 6 and the sealing part 3, the stability of the capacitor element 1 improves, and the vibration resistance of the electrolytic capacitor can be improved.

The sintered material 22 of aluminum powder according to the embodiment is formed on both surfaces or one surface of the base material 21. However, the base material 21 does not always have to be contained, and the electrode foil (the anode foil 20) may be composed only of the sintered material 22 of aluminum powder. In this manner, regardless of the presence or the absence of the base material 21, an electrode foil (the anode foil 20 here) in which at least a surface is formed with the sintered material 22 is referred to as a "sintered material foil" in the present application. In the electrolytic capacitor 10 according to the embodiment, the anode foil 20 contains a sintered material foil, and the cathode foil 23 contains an etching foil. However, in the electrolytic capacitor 10 according to the present invention, at least one electrode foil (the anode foil 20 or the cathode foil 23) of the electrode foils (the anode foil 20 and the cathode foil 23) should contain a sintered material foil. For example, both of the anode foil 20 and the cathode foil 23 may contain sintered material foils.

According to the embodiment, the electrode foil (the anode foil 20) has a surface area which is the same as or larger than the pit area of a conventional etching foil, and thus a large capacitance can be achieved. Moreover, compared to a conventionally proposed aluminum sintered material capacitor (for example, PTL 1), because the embodiment has a structure in which the sintered material 22 in a foil form is wound, the distance between the anode and cathode collectors is short. Thus, the resistance through the electrolytic solution becomes small, and the capacitance at a high frequency (around 10 kHz) is excellent. Moreover, compared also to an electrolytic capacitor using a foil to which fine aluminum powder is adhered (for example, PTL 2 or 3), the embodiment has an excellent capacitance at a high frequency (around 10 kHz).

Here, the sintered material 22 of powder refers to a sintered material formed with sintered particles of powder. The sintered particles mean sintered particles in which particles of powder (referred to as "powder particles" in the present application) are sintered (referred to as "sintered particles" in the present application).

The sintered material 22 of aluminum powder according to the embodiment is formed with sintered particles of powder of at least one kind of aluminum and an aluminum alloy. The aluminum in the aluminum and the aluminum alloy preferably has an aluminum purity of 99.8 weight % or more to prevent defects caused by impurities and has more preferably an aluminum purity of 99.99 weight % or more particularly to suppress an increase in the leakage current in response to a high-temperature load. In the case of an aluminum alloy, for example, an alloy containing one kind or two or more kinds of elements such as silicon (Si), iron (Fe), copper (Cu), manganese (Mn), magnesium (Mg), chromium (Cr), zinc (Zn), titanium (Ti), vanadium (V), gallium (Ga), nickel (Ni), boron (B) and zirconium (Zr) can be used. In this case, the amounts of the elements are each preferably 100 weight ppm or less, particularly preferably 50 weight ppm or less.

In the sintered material 22, the sintered particles of powder of at least one kind of aluminum and an aluminum alloy are sintered while the particles maintain gaps. That is, the sintered particles are connected while maintaining gaps and have a three-dimensional mesh structure. With such a porous sintered material, a desired capacitance can be obtained without conducting etching treatment. The porosity of the sintered material 22 can be appropriately set generally in a range of 10% or more depending on the desired capacitance or the like. The porosity can be regulated, for example, with the particle size of the powder of the aluminum or the aluminum alloy as the starting material, the composition of a paste composition containing the powder (a resin binder) or the like.

The form of the sintered material 22 is not particularly restricted, but in the case of a structure containing the base material 21, a foil form having an average thickness on one surface of 5 µm or more and 100 µm or less, particularly 5 µm or more and 60 µm or less, is generally preferable. The average thickness can be calculated by observing the cross section of the sintered material foil with a scanning electron microscope (SEM) or the like, measuring the thicknesses of 10 points at random and determining the average.

Here, the average particle size of the sintered particles is preferably 80 µm or less. When the average particle size is more than 80 µm, a desired capacitance may not be obtained.

The average particle size of the sintered particles is preferably 1 µm or more. When the average particle size is less than 1 µm, desired voltage resistance may not be obtained. A small average particle size is advantageous to make the surface area large, but when the average particle size is too small, the space among the sintered particles is filled during formation of the anode oxide film according to the need, which may decrease the capacitance. To prevent such a decrease in the capacitance, the average particle size is more preferably 2.5 µm or more.

In particular, to make the capacitance characteristic at around 10 kHz excellent, the average particle size is preferably 2.5 µm or more and 6 µm or less.

The base material 21 is not particularly limited, but an aluminum foil can be suitably used. Here, the base material 21 can be used without subjecting to etching treatment but may be subjected to etching treatment according to the need.

For the aluminum foil as the base material 21, aluminum or an aluminum alloy having a similar composition to that of the powder according to the aluminum or the aluminum alloy described above can be used. In particular, to suppress an increase in the leakage current in response to a high-temperature load, the aluminum purity is more preferably 99.99 weight % or more.

The thickness of the aluminum foil as the base material 21 is not particularly limited but is preferably in the range of 5 µm or more and 100 µm or less, in particular 5 µm or more and 60 µm or less.

The method for forming the sintered material 22 on the base material 21 to obtain the electrode foil 20 (23) is by the method below. That is, the method includes:
1. a first step of forming a film of a composition containing powder of at least one kind of aluminum and an aluminum alloy on the base material 21; and
2. a second step of sintering the film at a temperature of 560° C. or higher and 660° C. or lower.

First Step

In the first step, a film of a composition containing powder of at least one kind of aluminum and an aluminum alloy is formed on the base material 21.

Regarding the composition and the component of the aluminum or the aluminum alloy, those described above can be used.

The particle shape of the powder, namely the powder particles, is not particularly limited, and any powder particles of a spherical form, an undefined form, a scale form or the like can be suitably used, but powder particles of a spherical form can be particularly suitably used.

The average particle size of the powder, namely the powder particles, is preferably 80 µm or less. When the average particle size is more than 80 µm, a desired capacitance may not be obtained.

The average particle size of the powder, namely the powder particles, is preferably 1 µm or more. When the average particle size is less than 1 µm, desired voltage resistance may not be obtained. A small average particle size is advantageous to make the surface area large, but when the average particle size is too small, the space among the sintered particles is filled during formation of the anode oxide film according to the need, which may decrease the capacitance. To prevent such a decrease in the capacitance, the average particle size is more preferably 2.5 µm or more.

In particular, to make the capacitance characteristic at around 10 kHz excellent, the average particle size is preferably 2.5 µm or more and 6 µm or less.

The particle size of the powder particles does not largely change also after sintering in the second step, and the average particle size of the sintered particles can also be adjusted to an equivalent size by adjusting the average particle size of the powder particles.

The composition may contain a resin binder, a medium (a solvent), a sintering additive, a surfactant or the like according to the need. Known materials or commercial materials can be used for all of the materials. In particular, a paste composition containing at least one kind of a resin binder and a medium is preferably used. According to this, a film can be formed efficiently.

Moreover, a known medium (solvent) can be used. For example, in addition to water, an organic medium such as ethanol, toluene, a ketone and an ester can be used.

Second Step

In the second step, the film is sintered at a temperature of 560° C. or higher and 660° C. or lower.

The sintering temperature is 560° C. or higher and 660° C. or lower, preferably 560° C. or higher and lower than 660° C., more preferably 570° C. or higher and 659° C. or lower. The sintering period differs with the sintering temperature or the like but can be appropriately determined generally in the range of around five hours to 24 hours.

The sintering atmosphere is not particularly restricted and may be, for example, any of vacuum atmosphere, inert gas atmosphere, oxidizing gas atmosphere (including atmospheric atmosphere), reducing atmosphere and the like, but in particular, vacuum atmosphere or reducing atmosphere is preferable. Moreover, the pressure condition may also be any of normal pressure (atmospheric pressure), reduced pressure and increased pressure.

When the composition contains an organic component such as a resin binder, heating treatment (degreasing treatment) in the temperature range of 100° C. or higher to 600° C. or lower for a holding period of five hours or longer is preferably conducted in advance after the first step before the second step. The heating treatment atmosphere is not particularly limited and may be, for example, any of vacuum atmosphere, inert gas atmosphere, oxidizing gas atmosphere and the like. Moreover, the pressure condition may also be any of normal pressure (atmospheric pressure), reduced pressure and increased pressure.

Through the second step, the electrode material of the present invention can be obtained. This can be directly used as an electrode (the electrode foil 20 (23)) for the aluminum electrolytic capacitor 10 without subjecting to etching treatment but may be subjected to etching treatment according to the need. When used as the electrode foil 20 (23), the electrode material is slit into an appropriate size after the second step or after the third step below when the third step is conducted.

Third Step

A chemical film (oxide film) can be formed by subjecting the electrode material to chemical conversion treatment as a third step according to the need. For example, by forming an oxide film as a dielectric material having voltage resistance by predetermined anodic oxidation treatment, the anode foil 20 for the electrolytic capacitor 10 having desired voltage resistance can be obtained.

Here, the electrode material after the second or third step may be used as the cathode foil 23, but the cathode foil 23 according to the embodiment is formed as an etching foil using an aluminum foil or an aluminum alloy foil as the electrode material after subjecting the electrode material to etching treatment. Of these, in the case of an aluminum alloy foil, for example, an aluminum alloy foil containing one kind or two or more kinds of elements such as silicon (Si), iron (Fe), copper (Cu), manganese (Mn), magnesium (Mg), chromium (Cr), zinc (Zn), titanium (Ti), vanadium (V), gallium (Ga), nickel (Ni), boron (B) and zirconium (Zr) in a total amount of 1 weight % or less can be used. Of these, for example, an aluminum alloy foil containing copper is subjected to etching treatment by a chemical etching method, and thus the cathode foil 23 can be produced at a relatively low cost.

The cathode foil 23 which is an etching foil is not generally subjected to chemical conversion treatment, but a natural oxide film is formed instead, or chemical conversion (formation of an oxide film) advances through the use of the electrolytic capacitor 10 (for example, repeated charging and discharging). Thus, for the purpose of suppressing the progress of chemical conversion during charging and discharging or another purpose in particular, the cathode foil 23 may be subjected to chemical conversion treatment in advance, and a chemical film (oxide film) may be formed. According to this, even when charging and discharging are repeated, the progress of chemical conversion of the cathode foil 23 can be suppressed. The chemical conversion voltage of the chemical cathode foil 23 is preferably set in the range of 2 V to 6 V.

Moreover, when at least one electrode foil (the anode foil 20 in this embodiment) is formed as a sintered material foil as in the embodiment, the foil capacity of the other electrode foil (the cathode foil 23 in this embodiment) is preferably set at a relatively large value in accordance with the sintered material foil having a large foil capacity. In the embodiment, when the foil capacity of the cathode foil 23 (the etching foil) is much smaller than the foil capacity of the anode foil 20 (the sintered material foil), the neutralization of the electric charge between the electrode foils 20, 23 becomes insufficient during discharging after repeated charging and discharging of the electrolytic capacitor 10. The electric charge causes an electric potential difference between the cathode foil 23 and electrolytic solution, and the chemical conversion of the cathode foil 23 advances. As a result, the foil capacity of the cathode foil 23 decreases, and the capacitance of the electrolytic capacitor 10 decreases. To prevent such deterioration of the electrolytic capacitor 10, when one electrode foil is formed as a sintered material foil, the foil capacity of the other electrode foil is preferably set at 30 $\mu F/cm^2$ or more, more preferably 80 $\mu F/cm^2$ or more, further preferably 100 $\mu F/cm^2$ or more. The foil capacity here refers to the capacitance of the foil measured according to the descriptions in JEITA standard: EIAJ RC-2364A "Test methods of electrode foil for aluminum electrolytic capacitors" (revised in March 1999) (https://www.jeita.or.jp/japanese/standard/book/RC-2364A/#target/page_no=1) of Japan Electronics and Information Technology Industries Association (former Electronic Industries Association of Japan).

Here, the cathode foil 23 according to the embodiment may be formed as a titanium deposition foil in which titanium is deposited on an aluminum foil or an aluminum alloy foil as the base material 21 or the like, other than the etching foil or the sintered material foil. The titanium deposition foil has a larger foil capacity than an etching foil, and thus a sufficient foil capacity can be secured in the cathode foil 23.

Next, the electrolytic solution is explained.

In the present invention, the specific resistance of the electrolytic solution is preferably 1500 $\Omega \cdot cm$ or less. According to this, the ratio of the capacitance at 10 kHz to the capacitance at 120 Hz is closer to 1 compared to a conventional value, and an excellent capacitance characteristic can be obtained in a wide frequency range. Moreover, to secure desired voltage resistance, the specific resistance of the electrolytic solution is preferably 100 $\Omega \cdot cm$ or more.

The electrolytic solution of the present invention contains at least an electrolyte and a solvent. Moreover, the additive described below may be added. As the solvent in which the electrolyte and the additive are dissolved, an organic solvent is preferably used alone, or a water-organic solvent-based solvent, namely a mixture of an organic solvent and water, can be used.

As the organic solvent, a protic solvent or an aprotic solvent can be used alone, or a mixture of two or more kinds thereof can be used. According to the need, any combination of one or more kinds of protic solvent and one or more kinds of aprotic solvent may also be used. Examples of appropriate protic solvents include alcohol compounds. Specific examples of the alcohol compounds which can be advantageously used here are not particularly limited but include those listed below, namely monohydric alcohols such as methyl alcohol, ethyl alcohol, propyl alcohol and butyl alcohol, dihydric alcohols (glycols) such as ethylene glycol, diethylene glycol, triethylene glycol, tetraethylene glycol, polyethylene glycol, propylene glycol, dipropylene glycol, tripropylene glycol, polypropylene glycol, 1,4-butanediol and 1,3-butanediol, trihydric alcohols such as glycerol, derivatives thereof and the like. Appropriate aprotic solvents are not particularly limited but include those listed below, namely lactone compounds such as γ-butyrolactone, γ-valerolactone and δ-valerolactone, sulfolane, methyl sulfolane, dimethyl sulfolane, propylene carbonate, ethylene carbonate, isobutylene carbonate, methyl pyrrolidone, imidazolidinone, pyrrolidine, pyrrolidinone, methyl pyrrolidinone, tetrahydrofuran, acetonitrile, N-methylformamide, N,N-dimethylformamide, nitrobenzene, derivatives thereof and other intramolecular polarizable compounds.

For the electrolytic solution related to the embodiment, instead of using an organic solvent alone, a water-organic solvent-based solvent can also be used as described above. Using such a water-organic solvent-based solvent, the freezing point of the solvent can be decreased. As a result, the specific resistance characteristic of the electrolytic solution at a low temperature can be improved, and an excellent low-temperature characteristic which is exhibited when the difference in the specific resistance between at a low temperature and normal temperature is small can be achieved.

More specifically, when ethylene glycol is used as an organic solvent for example, the boiling point of the protic organic solvent is 198° C., and the melting point is about −13° C. The temperature range required for a capacitor is generally −40° C. to 105° C. Thus, an electrolytic solution using the solvent has enough characteristics at a high temperature, but the electrical characteristics may decrease at a low temperature due to an increase in the viscosity or solidification of the electrolytic solution.

Thus, in the electrolytic solution related to the embodiment, while an organic solvent having an excellent thermal characteristic alone or a mixture of two or more kinds thereof is used, a water-organic solvent-based solvent is used by adding water when an organic solvent having a relatively high freezing point is used. Thus, the freezing point of the solvent can be decreased, and the electrical characteristic at a low temperature can be secured. Because this water-organic solvent-based electrolytic solution has a very high ability of dissolving the electrolyte and very high ion mobility, a far lower specific resistance than that of an electrolytic solution of an organic solvent alone can be achieved. Moreover, because the characteristics of the solvent are improved at a low temperature, an electrolytic solution having a remarkable characteristic, namely a small difference in the specific resistance between at a low temperature and normal temperature, is obtained. Accordingly, the electrolytic capacitor 10 using such an electrolytic solution can of course have an excellent thermal characteristic which reflects the characteristics of the electrolytic solution.

The amount of water added to the water-organic solvent-based solvent is preferably in the range of 0.1 mass % to 20 mass % of the total mass of the electrolytic solution. According to this, the low specific resistance and an excellent characteristic of repairing the oxide film can be achieved, and a relatively excellent characteristic of repairing the oxide film is exhibited because water molecules are used for repairing the oxide films of the electrode foils 20, 23.

Moreover, as the electrolyte, an organic acid, preferably a carboxylic acid, a salt thereof, a boron complex of a dicarboxylic acid or a hydroxycarboxylic acid, a salt thereof, an inorganic acid or a salt thereof is used. One of the electrolyte components may be used alone, or any combination of two or more kinds of electrolyte component may also be used. When an inorganic acid or a salt thereof is used in combination with a carboxylic acid, a salt thereof, a boron complex of a dicarboxylic acid or a hydroxycarboxylic acid or a salt thereof as the electrolyte component, a decrease in the freezing point of the electrolytic solution can be expected, which can thus contribute to further improvement of the low-temperature characteristic of the electrolytic solution.

Examples of the carboxylic acid which can be used as the electrolyte component are not limited to those listed below but include monocarboxylic acids typically including formic acid, acetic acid, propionic acid, butyric acid, p-nitrobenzoic acid, salicylic acid, benzoic acid, methylbenzoic acid, ethylbenzoic acid, isobutylbenzoic acid, sec-butylbenzoic acid, tert-butylbenzoic acid and the like, derivatives thereof, dicarboxylic acids typically including oxalic acid, malonic acid, succinic acid, glutaric acid, adipic acid, fumaric acid, maleic acid, phthalic acid, azelaic acid, sebacic acid, caprylic acid, 1,6-decanedicarboxylic acid, 5,6-decanedicarboxylic acid, methyladipic acid, ethyladipic acid, isobutyladipic acid, sec-butyladipic acid, tert-butyladipic acid, 2-methylnonanedioic acid, 3-tert-butylhexanedioic acid, brassylic acid, octadecenedioic acid, 12-vinyl-8-octadecenedioic acid, dimethyloctadecadiene tetracarboxylic acid and the like and derivatives thereof. Moreover, a carboxylic acid containing a hydroxyl group or the like, such as citric acid, can also be used.

Moreover, the dicarboxylic acid or the hydroxycarboxylic acid in the boron complex of a dicarboxylic acid or a hydroxycarboxylic acid which can be similarly used as the electrolyte component is not limited to those listed below, but examples thereof include borodioxalic acid, borodimalonic acid, borodisuccinic acid, borodiadipic acid, borodimaleic acid, borodiglycolic acid, borodilactic acid, borodimalic acid, boroditartaric acid, borodicitric acid, borodisalicylic acid, borodiphthalic acid, borodi(2-hydroxy) isobutyric acid, borodimandelic acid, borodi(3-hydroxy) propionic acid and the like.

Furthermore, examples of the inorganic acid which can be similarly used as the electrolyte component are not limited to those listed below but include phosphoric acid, phosphorous acid, phosphonic acid, hypophosphorous acid, phosphinic acid, alkylphosphoric acid, phosphomolybdic acid, boric acid, sulfamic acid and the like. According to the need, a derivative of such an inorganic acid may also be used.

As the salt of the carboxylic acid or the inorganic acid above, various generally known salts can be used. Examples of appropriate salts are not particularly limited, but the salt may be a sodium salt, a potassium salt, an ammonium salt, an alkylammonium salt or one kind or more selected from the amine salts and the amidine salts listed below. As the amine salt, a salt of a primary amine, a secondary amine or a tertiary amine can be used, and examples thereof include salts of methylamine, ethylamine, dimethylamine, diethylamine, trimethylamine, triethylamine, ethyldimethylamine, diethylmethylamine, methanolamine, ethanolamine, dimethanolamine, diethanolamine, trimethanolamine, triethanolamine, pyrrolidine, piperidine, piperazine, morpholine, methylmorpholine, ethylmorpholine, oxazolidine, thiomorpholine, thiazolidine morpholine, methylmorpholine, ethylmorpholine, oxazolidine, thiomorpholine, thiazolidine and the like. The amidine salts include salts of 1,3-dimethylimidazolinium, 1,3-diethylimidazolinium, 1,2,3-trimethylimidazolinium, 1,2,3,4-tetramethylimidazolinium, 1,3-dimethyl-2-ethylimidazolinium, 1,2-dimethyl-3-ethylimidazolinium, 1,2-dimethyl-3-ethylimidazolinium, 1,2,3-triethylimidazolinium, 1,2,3,4-tetraethylimidazolinium and the like. Moreover, a tetraalkylammonium salt, an imidazolium salt or the like can also be used.

In addition, when the inorganic acid or the salt thereof is used as the electrolyte component, a decrease in the freezing point of the electrolytic solution can be expected, and this can contribute to improvement of the low-temperature characteristic of the electrolytic solution.

When an electrolyte component like such an inorganic acid or such a salt thereof is used in combination with an electrolyte component like the carboxylic acid or the salt thereof above, the lifetime of the electrolytic capacitor 10 is extended significantly compared to the case using the carboxylic acid or the salt thereof alone.

In the electrolytic solution related to the embodiment, the amount of the electrolyte contained can be appropriately determined depending on the conditions such as the characteristics required for the electrolytic solution, the kind of the used solvent and the kind of the used electrolyte. In general, when the carboxylic acid or the salt thereof is used as the electrolyte, for example, the amount thereof is desirably around 3 mass % to 30 mass % of the total mass of the electrolytic solution. When the amount of the electrolyte is less than 3 mass %, desired electric conductance cannot be secured sufficiently, while the effects are saturated, and the electrolyte is not easily dissolved in the solvent when the amount exceeds 30 mass %.

Moreover, in general, when the inorganic acid or the salt thereof is used as the electrolyte, the amount thereof is desirably around 0.1 mass % to 15 mass % of the total mass of the electrolytic solution. When the amount of the electrolyte is less than 0.1 mass %, desired electric conductance cannot be easily secured sufficiently, while the electric conductance becomes gradually saturated, and the electrolyte is not easily dissolved in the solvent when the amount exceeds 15 mass %. In the case of combination use, the carboxylic acid or the salt thereof and the inorganic acid or the salt thereof can be used in the range of around 0.1 mass % to 15 mass % of the total mass of the electrolytic solution. As described above, however, the amount of the electrolyte can be appropriately determined depending on the conditions such as the characteristics required for the electrolytic solution and the kind of the used electrolyte. For example, an oxygen acid of phosphorus (phosphoric acid, phosphorous acid, hypophosphorous acid or the like) suppresses hydration reaction of the electrode foils 20, 23 and thus achieves a long lifetime of the electrolytic capacitor 10. The effect of action is exhibited when the oxygen acid of phosphorus or a salt thereof is contained at least in an amount of 0.01 mass % of the total mass of the electrolytic solution. Accordingly, as well as by combining electrolyte components according to the need, by adjusting the electrolyte component amounts or the like, desired electric conductance may be secured, and desired characteristics may be obtained.

Furthermore, an additive such as (1) a chelating compound, (2) a saccharide, (3) gluconic acid and (or) gluconolactone, (4) a nitro compound, (5) a polymer compound and (6) a phosphate ester is preferably added to the electrolytic solution related to the embodiment according to the need. One of the additives may be used alone, or any combination of two or more kinds of the additives may also be used. The additives are explained below.

(1) Chelating Compound

As the chelating compound, for example, ethylenediaminetetraacetic acid (EDTA), trans-1,2-diaminocyclohexane-N,N,N',N',N'-tetraacetic acid-hydrate (CyDTA), dihydroxyethylglycine (DHEG), ethylenediaminetetrakis (methylenephosphonic acid) (EDTPO), diethylenetriamine-N,N,N',N'',N''-pentaacetic acid (DTPA), diaminopropanol tetraacetic acid (DPTA-OH), ethylenediaminediacetic acid (EDDA), ethylenediamine-N,N'-bis(methylenephosphonic acid) ½ hydrate (EDDPO), glycol ether diamine tetraacetic acid (GEDTA), hydroxyethylethylenediamine triacetic acid (EDTA-OH) or the like can be used. The chelating compound is generally preferably added in the range of 0.01 mass % to 3 mass % of the total mass of the electrolytic solution. In a low-impedance capacitor, such a chelating compound can bring about the effects of achieving a long lifetime of the electrolytic capacitor 10 through suppression of the hydration reaction of the aluminum (Al) electrode foils 20, 23, improving the low-temperature characteristic of the electrolytic capacitor 10 (the change in the impedance between at normal temperature and a low temperature becomes small because the solvent has a composition close to an ice-free state), improving the corrosion resistance and the like.

(2) Saccharide

Examples of the saccharide include monosaccharides such as glucose, fructose, xylose, galactose, ribose, mannose, arabinose, lyxose, allose, aldose, gulose, idose and talose, derivatives thereof, sugar alcohols such as erythritol, xylitol and mannitol, disaccharides such as maltose, sucrose, lactose, cellobiose, sucrose and agarobiose, derivatives thereof, trisaccharides such as maltotriose, derivatives thereof, polysaccharides such as starch, glycogen, alginic acid, agar and mannan, derivatives thereof and the like. The saccharide is generally preferably added in the range of 0.01 mass % to 5 mass % of the total mass of the electrolytic solution. Such a saccharide can bring about the effects of achieving a long lifetime of the electrolytic capacitor 10 through the action of protecting the electrode foils 20, 23, achieving a long lifetime of the electrolytic capacitor 10 through suppression of the hydration reaction of the aluminum (Al) electrode foils 20, 23 in a low-impedance capacitor, suppressing deterioration of a predetermined electrolyte component (for example, suppression of degradation or activation of a carboxylic acid), improving the low-temperature characteristic of the electrolytic capacitor 10 (the change in the impedance between at normal temperature and a low temperature becomes small because the solvent has a composition close to an ice-free state) and the like. When such a saccharide is used together with boric acid or a derivative thereof, the solubility of the saccharide improves through formation of an ester thereof. Accordingly, addition of a predetermined amount of a saccharide becomes surely possible, and these can be caused to act sufficiently in the electrolytic solution. As a result, a stable and sufficiently long lifetime of the electrolytic capacitor 10 can be achieved. At this point, boric acid or the derivative thereof may be added to the electrolytic solution as an electrolyte component (a solute component) or may be added solely for the purpose of reaction with the saccharide. As the saccharide which is added with boric acid or the derivative thereof, mannitol or the like is suitably applied. The ratio of boric acid or the derivative thereof and the saccharide is preferably in the range of "boric acid or the derivative thereof:the saccharide=10:1 to 1:5". When the amount of the saccharide is too high, dissolution thereof in the solvent becomes difficult.

(3) Gluconic Acid and (or) Gluconolactone

The electrolytic solution related to the embodiment can contain one of gluconic acid and (or) gluconolactone and the like alone or a combination thereof according to the need. An additive of this kind is generally preferably added in the range of 0.01 mass % to 5 mass % of the total mass of the electrolytic solution.

(4) Nitro Compound

The electrolytic solution related to the embodiment can contain at least one kind of nitro compound selected from nitrobenzene, nitrophenol (for example, p-nitrophenol), nitrobenzoic acid (for example, p-nitrobenzoic acid or dinitrobenzoic acid), nitroacetophenone (for example, p-nitroacetophenone), nitroanisole, nitrobenzylalcohol, nitroxylene and other aromatic nitro compounds according to the need.

In the electrolytic solution related to the embodiment, when the nitro compound above is used, the effect of absorbing hydrogen gas generated at the electrode foils 20, 23 is exhibited. Moreover, a further preferable effect can be expected when two or more kinds of the nitro compounds are mixed and used rather than using one kind of the nitro compounds alone. Furthermore, the nitro compound is generally preferably used by adding in the range of 0.01 mass % to 5 mass % of the total mass of the electrolytic solution. When the amount of the nitro compound is less than 0.01 mass %, the expected effect can be hardly obtained, while even when the amount exceeds 5 mass %, further improvement of the expected effect cannot be expected, and an adverse effect on other characteristics may be exerted in some cases.

Use of the nitro compound is further explained. Regarding the absorption of hydrogen gas generated during reaction of aluminum and water, when a nitro compound is used alone, there is a tendency towards a decrease in the absorption effect as the water content of the used solvent increases, and the tendency towards the decrease in the absorption effect becomes significant when the electrolytic solution is left in a high-temperature environment. However, such a problem which arises due to the single use of a nitro compound can be solved using two or more kinds of nitro compound in combination.

(5) Polymer Compound

As the polymer compound, for example, water-soluble silicone, polyacrylic acid, a derivative thereof, polymethacrylic acid, a derivative thereof, polyacrylamide, a derivative thereof, polyglutamic acid, a derivative thereof, polyglycerol, a derivative thereof, polyethylene glycol, a derivative thereof, polypropylene glycol, a derivative thereof, polyvinyl alcohol, a derivative thereof, polyoxyethylene glycol, a derivative thereof, a polyoxyalkylene compound, polysiloxane, silicon dioxide or the like can be used. One kind thereof may be used alone, or any combination of two or more kinds thereof may be used. The total amount thereof is preferably in the range of 0.1 mass % to 30 mass % of the total mass of the electrolytic solution. Such a polymer compound can bring about the effects of improving the voltage resistance characteristic of the electrolytic capacitor 10, achieving a long lifetime of the electrolytic capacitor 10 and the like, which correspond to the action of each polymer compound.

Regarding the molecular weight of the polymer compound, depending on the action of each polymer compound, the solubility/the dispersibility in the solvent, a desired effect and the like, a wide range from those having a relatively low molecular weight (oligomers) to those having a high molecular weight can be used.

(6) Phosphate Ester

As the phosphate ester, for example, methyl phosphate ester, ethyl phosphate ester, dimethyl phosphate ester, diethyl phosphate ester, trimethyl phosphate ester, triethyl phosphate ester or the like can be used. Such a phosphate ester suppresses the hydration reaction of the electrode foils 20, 23 like the chelating compound and the like and thus suppresses the deterioration of the electrode foils 20, 23, and the phosphate ester can also suppress the generation of hydrogen gas and achieve a long lifetime of the electrolytic capacitor 10.

Furthermore, the electrolytic solution related to the embodiment may further contain an additive commonly used in the field of aluminum electrolytic capacitors and other electrolytic capacitors in addition to the additives above. Examples of appropriate additives include a silane coupling agent, a polymer electrolyte, colloidal silica and the like.

The separators 24, 25 related to the embodiment are not particularly limited, but preferably, those produced using a naturally produced cellulose material, such as pulp of Manila hemp or a plant, as a raw material by subjecting the raw material pulp to a dust removal step, a washing step, a beating step, a paper making step and the like can be advantageously used. Moreover, a woven cloth, a non-woven cloth, a sheet, a film or the like produced from synthetic fibers of rayon, nylon, polyester, a polyvinyl compound, aramid, acryl, polyurethane or the like can also be used. In addition, a blended paper product, a blended fabric product or the like of natural fibers and synthetic fibers can also be used.

Here, the paths to the deep parts of the pits (which mean the space formed in the sintered material here) in the sintered material foil are relatively long, and the sintered material foil may not be sufficiently impregnated with an electrolytic solution having a high viscosity. For example, when a certain amount or more of a polymer compound or the like having the effect of improving pressure resistance is added to an electrolytic solution which is applied to the electrolytic capacitor 10 for a high voltage, the electrolytic solution has a high viscosity due to the viscosity of the polymer compound or the like, and the impregnation may become insufficient. Thus, in the electrolytic capacitor 10 for a high voltage for example, prior to the production of the capacitor element 1 (winding in the embodiment), an additive for the electrolytic solution having the effect of improving voltage resistance such as a polymer compound is preferably applied in advance to the separators 24, 25. According to this, an electrolytic solution having a relatively low viscosity which does not contain the additive at all or contains only a low amount can be obtained, and the decrease in the impregnation property can be prevented.

Moreover, fine powder or burrs are caused easily in the sintered material foil during slitting, and because of these, the incidence of a short circuit in the electrolytic capacitor 10 having the sintered material foil is relatively high. Thus, in the electrolytic capacitor 10 according to the embodiment, the thicknesses of the separators 24, 25 are preferably set in the range of 20 μm to 150 μm, and the densities are preferably set in the range of 0.2 g/cm$^3$ to 1.0 g/cm$^3$. According to this, the incidence of a short circuit can be decreased.

The capacitor element 1 according to the embodiment has the anode foil 20, which is a sintered material foil, the cathode foil 23, which is an etching foil, and the separators 24, 25 interposed between the anode foil 20 and the cathode foil 23 explained above. In the production procedures, first, after forming the sintered material, the anode foil 20 after a chemical conversion step is slit into an appropriate size. Moreover, the cathode foil 23 after an etching step is similarly slit into an appropriate size. Subsequently, the lead tabs 5 are connected to the anode foil 20 and the cathode foil 23. The electrode foils 20, 23 and the lead tabs 5 can be connected, for example, using a known method such as swaging, cold pressure welding, ultrasonic connection and laser beam welding. In swaging, to prevent foil fracture during connection, through holes may be formed in advance at the connection parts of the electrode foils 20, 23 prior to the connection by pressing. In cold pressure welding, the die in contact with the electrode foils 20, 23, of the dies for pressure welding, may be coated with a material with high hardness and a low friction property such as diamond-like carbon (DLC) and titanium carbide (TIC). According to this, the friction resistance of the die is secured, and adhesion and accumulation of finer powder of the electrode foils 20, 23 and the like can be prevented.

Subsequently, in the case of a winding-type electrolytic capacitor 10, as illustrated in FIG. 2, the anode foil 20, the cathode foil 23 and the separators 24, 25 are wound in such a manner that the anode foil 20 and the cathode foil 23 are divided with the first separator 24 or the second separator 25 to produce the capacitor element 1 (the lead wires 2 (the lead tabs 5 and the terminals 6) are not illustrated in FIG. 2). Subsequently, by immersing the capacitor element 1 in an electrolytic solution, the capacitor element 1 is impregnated with the electrolytic solution. The impregnation with the electrolytic solution may be conducted under normal pressure (under atmospheric pressure) but is more preferably conducted under reduced pressure. In the reduced-pressure style, the capacitor element 1 is immersed in the electrolytic solution in a reduced-pressure atmosphere and returned to the atmospheric pressure atmosphere after a certain time while maintaining the immersed state, and thus the capacitor element 1 is impregnated with the electrolytic solution. Moreover, after returning to the atmospheric atmosphere, the capacitor element 1 may be further brought into an increased-pressure atmosphere while maintaining the immersed state. The reduced pressure is preferably 1.5 kPa or less as the absolute pressure, and the increased pressure is preferably in the range of 0.15 MPa to 1.0 MPa as the gauge pressure. Here, the electrolytic solution may be heated within the range in which the evaporation of the electrolytic solution component is acceptable, during the time under the reduced pressure to the increased pressure. When the electrolytic solution is heated, the viscosity of the electrolytic solution decreases, and thus the impregnation property can be increased.

Subsequently, the capacitor element 1 impregnated with the electrolytic solution is housed in the external case 4. Subsequently, the opening of the external case 4 is tightly closed with the sealing part 3, and the opening edge is swaged. By the above procedures, the electrolytic capacitor 10 can be produced. Then, aging treatment may be conducted according to the need.

The lead wires 2 are extracted from the lead wire through holes of the sealing part 3. The terminals 6, which are used as external connection terminals or external electrode terminals, may be formed with the lead tabs 5 in one piece or may be connected to the lead tabs 5 at an appropriate timing during the production steps of the electrolytic capacitor 10. The lead wires 2 (the lead tabs 5 and the terminals 6) can be formed with various metal materials such as iron, copper, tin, lead, silver, gold, zinc, bismuth, tungsten, nickel, titanium and chromium. For the purpose of decreasing the ESR of the electrolytic capacitor 10 or another purpose, the lead wires 2 are advantageously formed with a metal material having high conductance, such as copper, silver, iron and gold, and further advantageously formed with copper or silver.

Moreover, in the lead tabs 5, which are the connectors to the electrode foils 20, 23, an electric potential difference from the electrolytic solution is caused due to repeated charging and discharging of the electrolytic capacitor 10 as in the etching foil (the cathode foil 23) above, and chemical conversion is advanced. Thus, for the purpose of suppressing the progress of chemical conversion during charging and discharging or another purpose, the lead tabs 5 may be subjected to chemical conversion treatment to form a chemical film (an oxide film). According to this, the effect of reducing the leakage current is obtained. The chemical conversion treatment here is preferably chemical conversion with phosphoric acid or chemical conversion with adipic acid. According to this, the films can be repaired in a shorter time because a substance with excellent chemical conversion property can be disposed on the lead tabs 5 and the electrode foils 20, 23, and the increase in the leakage current can be prevented even when a mechanical stress is applied.

When the chemical conversion of the lead tab 5 connected to the cathode foil 23 (etching foil) is advanced due to repeated charging and discharging of the electrolytic capacitor 10 or the like, a short circuit of the lead tab 5 and the anode foil 20 (sintered material foil) may be caused by heat generated by charging and discharging or the like. Thus, in particular, the lead tab 5 connected to the cathode foil 23 may be subjected to etching treatment and further to chemical conversion treatment. According to this, by further suppressing the progress of chemical conversion, a short circuit can be prevented. Here, the lead tab 5 connected to the anode foil 20 may be subjected to etching treatment.

As the external case 4 for housing the capacitor element 1, an aluminum case which has been generally used can be suitably used. When higher strength is required, non-heated aluminum having a purity of 99.0% or more (for example, a non-heated material of aluminum 1100), heated aluminum having a purity of 99.0% or more (for example, H22 material of 1000-series aluminum), a thermal refined material of an aluminum alloy containing manganese (Mn) and (or) magnesium (Mg) (for example, O material of aluminum alloy 3003, H22 material of 3000-series aluminum alloy or O material of aluminum alloy 3004) or the like can be used.

The capacitor element 1 may be adhered and housed in the external case 4 using an adhesive. According to this, the capacitor element 1 can be fixed, and the vibration resistance of the electrolytic capacitor 10 can be improved. As the adhesive, a known adhesive can be appropriately used.

The sealing part 3 used for the electrolytic capacitor 10 in the embodiment can be formed from various commonly used materials as long as the material thereof has high hardness and adequate elasticity and does not allow the electrolytic solution to permeate and the air tightness as the sealing part 3 is excellent. Examples of appropriate material for the sealing part 3 include elastic rubbers such as natural rubber (NR), styrene·butadiene rubber (SBR), ethylene·propylene terpolymer (EPT) and isobutylene·isoprene rubber (IIR). In particular, isobutylene·isoprene rubber (IIR) is suitable because the air tightness is high and because the electrolytic solution as steam does not permeate. Moreover, IIR having better heat resistance, such as sulfur-vulcanized, quinoid-vulcanized, resin-vulcanized or peroxide-vulcanized IIR, is further preferably used.

Furthermore, to suppress the mechanical stress, a method using a rubber material having higher hardness is also available. When a sealing rubber having hardness of 80 (IRHD/M) or more in rubber hardness measurement (30-second value) by an IRHD hardness tester is used, the mechanical stress is not easily applied, and the increase in the leakage current can be suppressed.

Instead of the materials of the sealing part 3 above, a hybrid material obtained by pasting a resin material having air tightness and sufficiently high strength and an elastic rubber can also be advantageously used. Examples of the resin material include a fluoropolymer such as PTFE, polyphenylene sulfide (PPS), polyarylate (PAR), a liquid crystal polymer, polysulfone (PSF), polyethersulfone, polyether ether ketone (PEEK), polyetherimide (PEI), polyamide (aromatic polyamide or aliphatic polyamide), polyimide (PI), polyamideimide (PAI), polycarbonate, polyacetal, a phenolic resin, modified polyphenylene ether and the like. Here, the sealing part 3 having two layers of such a resin material and a rubber material is suitably applied to a snap-in type electrolytic capacitor.

EXAMPLES

Next, the present invention is explained further by Examples. The Examples described here are examples of the present invention and are not intended to limit the present invention. In this regard, "%" in the tables indicates "mass %".

Example 1

In this example, an aluminum electrolytic capacitor having a winding structure was produced according to the procedures below.

An anode foil of an aluminum powder sintered material was produced by the production method disclosed above (the first step to the third step), and then a lead wire for extracting an electrode was attached. Moreover, a separate aluminum foil was subjected to electrochemical etching treatment to produce a cathode foil, and then a lead wire for extracting an electrode was attached. Subsequently, by winding the anode foil and the cathode foil with a separator (an isolation paper) sandwiched between the foils, a capacitor element was produced. Moreover, based on the composition table shown in Table 1 below, the solvent component and the electrolyte components were sequentially added to a certain container and then dissolved by stirring, and thus an electrolytic solution was prepared.

The capacitor element was impregnated with the electrolytic solution produced by the preparation method above and then housed in an aluminum case with a bottom in such a manner that the lead wires for extracting the electrodes would be outside the case, and the opening of the case was tightly closed with an elastic sealing part. Then, aging treatment was conducted, and an electrolytic capacitor having a winding structure was thus produced.

Comparative Example 1

In Comparative Example 1, after subjecting an aluminum foil to electrochemical etching treatment, an oxide film was formed on the surface by anodic oxidation treatment, and this was used as the anode foil. The rest of the method for producing the electrolytic capacitor was the same as the method described in Example 1 above.

In both Example 1 and Comparative Example 1, samples with foil pressure resistance which was equivalent to capacitor pressure resistance of 400 WV were produced.

Next, the capacitances of the electrolytic capacitors produced in Example 1 and Comparative Example 1 were measured at 25° C. and at frequencies of 120 Hz and 10 kHz, and the measured values shown in Table 1 below were obtained.

TABLE 1

| | | Composition of Electrolytic Capacitor | | | Capacitor Capacitance (µF) | |
|---|---|---|---|---|---|---|
| | | | | | 120 Hz | 10 kHz |
| Example 1 | Anode Foil | Aluminum Powder Sintered Material Foil, Average Powder Particle Size of 2.5 µm | | | 27.48 | 22.25 |
| | Cathode Foil | Aluminum Etching Foil | | | | |
| | Electrolytic Solution | Ethylene Glycol | 94% | Specific Resistance of Electrolytic Solution (1000 $\Omega \cdot$ cm, 30° C.) | | |
| | | Ammonium Azelate | 5% | | | |
| | | p-Nitrobenzoic Acid | 1% | | | |
| Comparative Example 1 | Anode Foil | Aluminum Etching Foil | | | 21.62 | 16.95 |
| | Cathode Foil | Aluminum Etching Foil | | | | |
| | Electrolytic Solution | Ethylene Glycol | 94% | Specific Resistance of Electrolytic Solution (1000 $\Omega \cdot$ cm, 30° C.) | | |
| | | Ammonium Azelate | 5% | | | |
| | | p-Nitrobenzoic Acid | 1% | | | |

When the capacitor capacitances of Example 1 and Comparative Example 1 are compared, it can be seen that the capacitance of Example 1, in which an anode foil of an aluminum powder sintered material was used, was larger than that of Comparative Example 1, in which an etching anode foil was used.

Examples 2 to 12

Next, the relations between the specific resistance of the electrolytic solution and the capacitor capacitance of capacitors produced by the same method as that in Example 1 for average powder particle sizes of 2.5 μm and 6 μm are compared. The same method as that in Example 1 above was repeated as the method for producing the electrolytic capacitors of Examples 2 to 12, and regarding the method for producing the electrolytic solutions, those containing the same components as those of Example 1 above and having specific resistance values of 100 Ω·cm, 30° C. to 2000 Ω·cm, 30° C. were produced by adjusting the compositions. Samples having foil pressure resistance which was equivalent to capacitor pressure resistance of 400 WV were produced for those having an average powder particle size of 2.5 μm, and samples having foil pressure resistance which was equivalent to capacitor pressure resistance of 450 WV were produced for those having an average powder particle size of 6 μm.

Comparative Examples 2 to 12

The same method as that in Comparative Example 1 above was repeated as the method for producing capacitors having an aluminum etching foil used for Comparative Examples 2 to 12, and the method described in Examples 2 to 12 above was repeated as the method for producing the electrolytic solutions. As in Examples 2 to 12, samples having foil pressure resistance values which were equivalent to capacitor pressure resistance values of 400 WV and 450 WV were produced.

Next, the capacitances of the electrolytic capacitors produced in Examples 1 to 12 and Comparative Examples 1 to 12 were measured at 25° C. and at frequencies of 120 Hz and 10 kHz, and the measured values shown in Table 2 and Table 3 below were obtained.

TABLE 2

Average Powder Particle Size of Aluminum Powder Sintered Material: 2.5 μm
Equivalent to Capacitor Pressure Resistance of 400 WV

| | Specific Resistance of Electrolytic Solution (Ω · cm, 30° C.) | Anode Foil | Capacitor Capacitance (μF) | | Ratio of 120 Hz and 10 kHz |
|---|---|---|---|---|---|
| | | | 120 Hz | 10 kHz | |
| Example 2 | 100 | Aluminum Powder Sintered Material Foil | 27.57 | 26.67 | 0.967 |
| Comparative Example 2 | | Aluminum Etching Foil | 22.42 | 21.54 | 0.961 |
| Example 3 | 400 | Aluminum Powder Sintered Material Foil | 27.7 | 25.11 | 0.906 |
| Comparative Example 3 | | Aluminum Etching Foil | 21.77 | 19.14 | 0.879 |
| Example 4 | 600 | Aluminum Powder Sintered Material Foil | 27.77 | 24.00 | 0.864 |
| Comparative Example 4 | | Aluminum Etching Foil | 21.65 | 17.83 | 0.824 |
| Example 1 | 1000 | Aluminum Powder Sintered Material Foil | 27.48 | 22.25 | 0.810 |
| Comparative Example 1 | | Aluminum Etching Foil | 21.62 | 16.95 | 0.784 |
| Example 5 | 1500 | Aluminum Powder Sintered Material Foil | 27.66 | 20.25 | 0.732 |
| Comparative Example 5 | | Aluminum Etching Foil | 21.53 | 15.62 | 0.725 |
| Example 6 | 2000 | Aluminum Powder Sintered Material Foil | 27.49 | 16.85 | 0.613 |
| Comparative Example 6 | | Aluminum Etching Foil | 21.43 | 13.15 | 0.614 |

TABLE 3

Average Powder Particle Size of Aluminum Powder Sintered Material: 6 μm
Equivalent to Capacitor Pressure Resistance of 450 WV

| | Specific Resistance of Electrolytic Solution (Ω · cm, 30° C.) | Anode Foil | Capacitor Capacitance (μF) | | Ratio of 120 Hz and 10 kHz |
|---|---|---|---|---|---|
| | | | 120 Hz | 10 kHz | |
| Example 7 | 100 | Aluminum Powder Sintered Material Foil | 20.62 | 20.01 | 0.970 |
| Comparative Example 7 | | Aluminum Etching Foil | 19.07 | 18.38 | 0.964 |
| Example 8 | 400 | Aluminum Powder Sintered Material Foil | 20.25 | 18.64 | 0.920 |
| Comparative Example 8 | | Aluminum Etching Foil | 18.57 | 17.07 | 0.919 |
| Example 9 | 600 | Aluminum Powder Sintered Material Foil | 20.32 | 18.04 | 0.888 |
| Comparative Example 9 | | Aluminum Etching Foil | 18.59 | 16.29 | 0.876 |
| Example 10 | 1000 | Aluminum Powder Sintered Material Foil | 20.16 | 15.78 | 0.783 |
| Comparative Example 10 | | Aluminum Etching Foil | 18.54 | 14.44 | 0.779 |
| Example 11 | 1500 | Aluminum Powder Sintered Material Foil | 20.22 | 14.74 | 0.729 |
| Comparative Example 11 | | Aluminum Etching Foil | 18.61 | 13.31 | 0.715 |
| Example 12 | 2000 | Aluminum Powder Sintered Material Foil | 20.11 | 11.73 | 0.583 |
| Comparative Example 12 | | Aluminum Etching Foil | 18.23 | 10.65 | 0.584 |

The capacitances at 120 Hz and 10 KHz are shown in Table 2 and Table 3. A typical application of a capacitor is for smoothing the primary side of a switching power supply, and this has a role of absorbing a current noise from a device, such as MOS-FET, which is repeatedly switched at a frequency of around 10 kHz at a later stage of the circuit, in addition to a role of smoothing the input voltage from the commercial power supply line. This noise is called EMI and adversely affects other electric devices through the commercial power supply line, and thus the noise is restricted by the EMC Directive (89/336/EEC). Increasing the capacitance at around 10 kHz contributes to reduction in the noise and thus is important. Here, the reason for describing the "ratio" of the capacitances at 120 Hz and 10 kHz here is to compare the easiness of obtaining the capacitance at 10 kHz compared to the capacitance generally specified by 120 Hz by describing the "ratio" because the value of an electrolytic capacitor using an aluminum powder sintered material foil having a large foil capacity is of course larger than that of an electrolytic capacitor using an etching foil when the capacitances themselves at 10 kHz are compared.

When the ratios of the capacitances at 120 Hz and 10 KHz shown in Table 2 and Table 3 are examined, the aluminum powder sintered material foils exhibited higher values than the etching foils when the specific resistance values of the electrolytic solutions were 100 Ω·cm to 1500 Ω·cm. At 2000 Ω·cm, the powder sintered material foils exhibited lower values than the etching foils, and this is believed to be because the structures of the aluminum powder sintered material foils were aggregated particles, rather than tunnel-type etching pits, which are found in conventional etching foils, resulting in long paths to the deep parts of the pits, and because the capacity at the high frequency was thus not easily obtained when the electrolytic solution having high specific resistance was used. That means that, when a foil of an aluminum powder sintered material and an electrolytic solution having specific resistance of 1500 Ω·cm or less are combined in an aluminum electrolytic capacitor, the capacity at 10 kHz relative to the capacity at 120 Hz is more easily obtained than in conventionally used aluminum etching foils.

Examples 13 and 14

Next, the relations between the purity of the aluminum base material and the lifetime of the capacitor are compared.

The electrolytic capacitor of Example 13 was produced using an aluminum powder sintered material foil in which the aluminum purity of the base material was 99.99 weight % or more and in which the aluminum purity of the powder was 99.99 weight % or more, and the method described in Example 1 was repeated for the rest of the method for producing the capacitor.

The electrolytic capacitor of Example 14 was produced using an aluminum powder sintered material foil in which the aluminum purity of the base material was 99.8 weight % or more and less than 99.95 weight % and in which the aluminum purity of the powder was 99.99 weight % or more, and the method described in Example 1 was repeated for the rest of the method for producing the capacitor.

Figure 3:
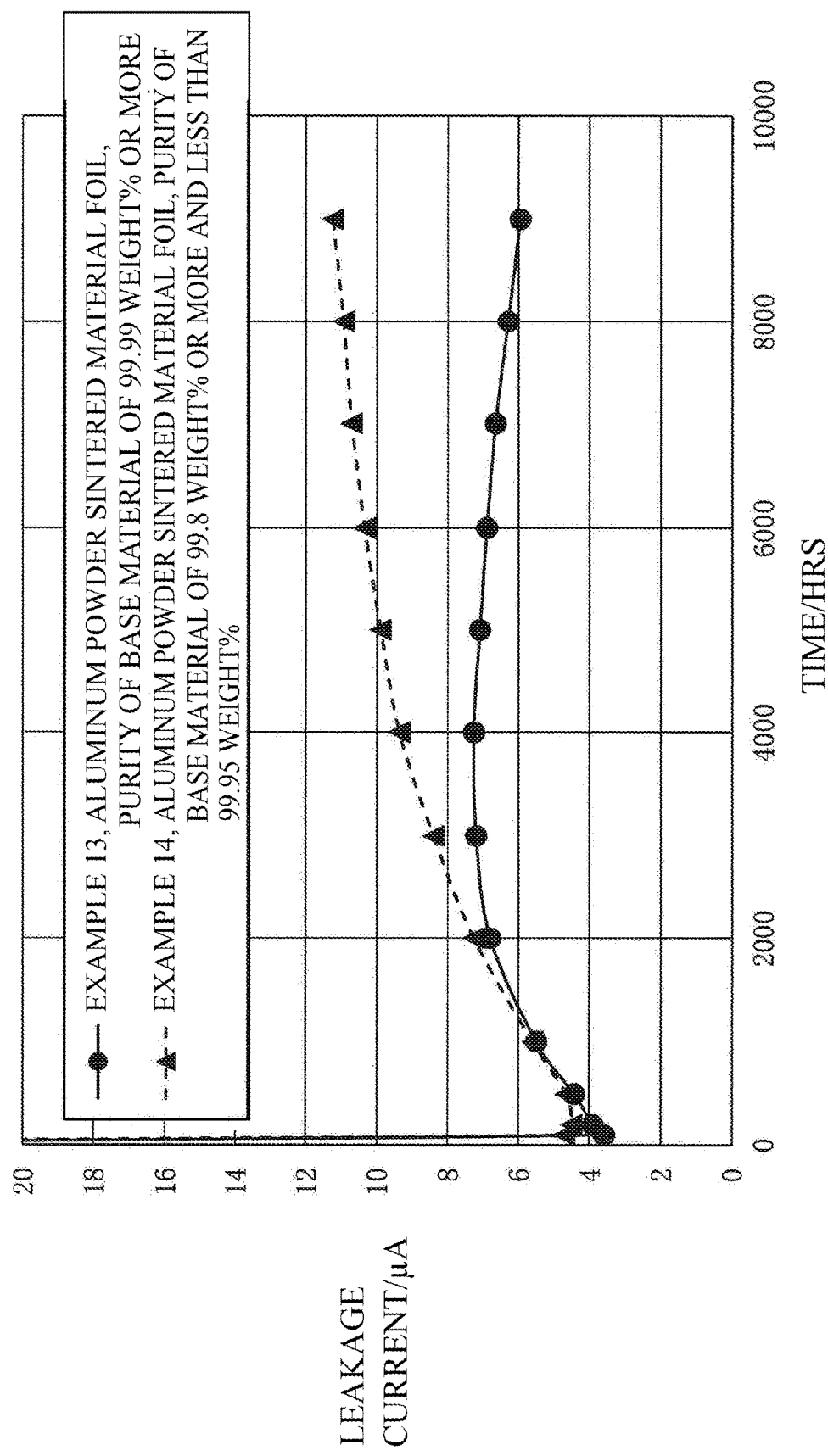
FIG. 3 is a graph showing the leakage current values in a high-temperature load test of the electrolytic capacitors of Example 13 and Example 14.

Next, a high-temperature load test at 425 V and 105° C. was conducted using the electrolytic capacitors of Examples 13 and 14. FIG. 3 shows the leakage current values of the electrolytic capacitors in the high-temperature load test. The capacitors according to all the Examples had low leakage current values of less than 12 μA, but in particular, the capacitor in which the purity of the base material was 99.99 weight % or more (Example 13) did not show any tendency towards an increase in the leakage current at 3000 hours or later, and an increase in the leakage current was suppressed. An increase in the leakage current leads to an increase in the amount of gas generation in the capacitor and increases the risk of early valve operation through a gradual increase in the internal pressure. Thus, to achieve an excellent lifetime characteristic, the aluminum purity of the base material is more preferably 99.99 weight % or more. Moreover, it is obvious that an aluminum purity of 99.99 weight % or more is preferable for the same reason also for the aluminum powder which is electrically connected to the base material.

In the present specification, the "average particle size (D50)" means the particle size at the integrated value of 50% in the particle size distribution based on volume determined by the laser diffraction-scattering method in the case of powder and means the particle size at the integrated value of 50% in the particle size distribution based on volume of the sintered particles measured by observation of the surface or the cross section of the sintered material with a scanning electron microscope in the case of sintered particles. The observed sintered particles are measured using the diameters as the particle sizes. In this regard, however, sintered particles are sometimes in the state in which the sintered powder particles are melted and in which the shapes are partially lost or in the state in which the sintered powder particles are partially connected. In the case, a part having an approximately circular shape is considered as one sintered particle for approximation, and the maximum diameter thereof is measured as the particle size. Parts which are difficult to identify as approximately circular shapes are excluded. The particle sizes of a predetermined number of sintered particles are measured, and the particle size distribution based on volume is calculated from the particle size distribution based on number. Then, the particle size at the integrated value of 50% in the particle size distribution is obtained as the average particle size (D50) of the sintered particles. Here, the particle sizes of the powder particles rarely change during sintering, and the average particle size (D50) of the powder determined by the above method is substantially the same as the average particle size (D50) of the sintered particles of the powder.

What is claimed is:

1. An electrolytic capacitor having a capacitor element having an anode foil, a cathode foil and a separator interposed between the anode foil and the cathode foil and an electrolytic solution impregnated in the capacitor element
   which is characterized in that the anode foil or the cathode foil has a sintered material formed with sintered particles of powder of at least one kind of aluminum and an aluminum alloy,
   a specific resistance of the electrolytic solution is 400 to 1500 Ω·cm, and
   an average particle size (D50) of the powder or the sintered particles is 6 μm or less.

2. The electrolytic capacitor according to claim 1 which is characterized in that the anode foil or the cathode foil is formed with the sintered material and a base material supporting the sintered material.

3. The electrolytic capacitor according to claim 1 which is characterized in that
   the electrolytic solution contains
   a solvent containing an organic solvent or a solvent containing a mixture of water and an organic solvent and
   at least one kind of electrolyte selected from the group consisting of an organic acid or an organic acid salt, an inorganic acid or an inorganic acid salt and a mixture of an organic acid or an organic acid salt and an inorganic acid or an inorganic acid salt.

* * * * *